United States Patent
Kim

(10) Patent No.: US 11,659,790 B2
(45) Date of Patent: May 30, 2023

(54) LIGHT MODULE FOR PLANT CULTIVATION AND LIGHT DEVICE INCLUDING THEREOF

(71) Applicant: SEOUL VIOSYS CO., LTD., Gyeonggi-do (KR)

(72) Inventor: Se Ryung Kim, Gyeonggi-do (KR)

(73) Assignee: Seoul Viosys Co., Ltd., Gyeonggi-do (KR)

(*) Notice: Subject to any disclaimer, the term of this patent is extended or adjusted under 35 U.S.C. 154(b) by 0 days.

(21) Appl. No.: 17/584,900

(22) Filed: Jan. 26, 2022

(65) Prior Publication Data

US 2022/0240457 A1 Aug. 4, 2022

Related U.S. Application Data

(60) Provisional application No. 63/144,078, filed on Feb. 1, 2021.

(51) Int. Cl.
*A01G 7/04* (2006.01)
*F21V 23/00* (2015.01)
*F21Y 113/10* (2016.01)

(52) U.S. Cl.
CPC .......... *A01G 7/045* (2013.01); *F21V 23/003* (2013.01); *F21Y 2113/10* (2016.08)

(58) Field of Classification Search
CPC .............................. A01G 7/045; F21V 23/003
USPC ........................................................ 362/231
See application file for complete search history.

(56) References Cited

U.S. PATENT DOCUMENTS

| | | | | |
|---|---|---|---|---|
| 2004/0230102 A1* | 11/2004 | Anderson, Jr. | ........ | A01G 7/045 600/231 |
| 2005/0063194 A1* | 3/2005 | Lys | ......................... | B60Q 3/85 362/489 |
| 2011/0031894 A1* | 2/2011 | Van De Ven | ............. | F21K 9/62 362/231 |
| 2012/0020071 A1* | 1/2012 | McKenzie | .............. | F21V 5/048 362/231 |
| 2015/0181811 A1* | 7/2015 | Krijn | ...................... | H05B 45/10 362/382 |

(Continued)

FOREIGN PATENT DOCUMENTS

JP 2012183014 A 9/2012
JP 2018113934 A 7/2018

(Continued)

OTHER PUBLICATIONS

International Search Report issued in corresponding International Application No. PCT/KR2022/001499, English Translation, dated May 9, 2022, 3 pages.

*Primary Examiner* — Bryon T Gyllstrom
(74) *Attorney, Agent, or Firm* — LaBatt, LLC

(57) ABSTRACT

A light module includes a substrate, at least one first light source, at least one second light source, and at least one third light source. The first light source is disposed on the substrate and emits a first type of light towards a plant. The second light source is disposed on the substrate and emits a second type of light towards the plant. The third light source is disposed on the substrate and emits a third type of light towards the plant. The first to third types of light have peak wavelengths in different wavelength bands. The first type of light is UV light or blue light in a short wavelength band, the second type of light is UV light, and the third type of light is visible light.

19 Claims, 16 Drawing Sheets

(56) References Cited

U.S. PATENT DOCUMENTS

| | | | |
|---|---|---|---|
| 2015/0250106 A1* | 9/2015 | Wik | H05B 45/22 |
| | | | 315/158 |
| 2018/0213735 A1* | 8/2018 | Vail | A01G 7/045 |
| 2020/0053854 A1* | 2/2020 | Xu | G02B 6/0068 |

FOREIGN PATENT DOCUMENTS

| | | | |
|---|---|---|---|
| JP | 2018125237 A | | 8/2018 |
| KR | 1020200036103 A | | 4/2020 |
| KR | 1020200049369 A | | 5/2020 |

* cited by examiner

FIG. 7

| Period | Light period | Dark Period |
|---|---|---|
| First light source | | |
| Second light source | | |
| Third light source | | |

LIGHT MODULE FOR PLANT CULTIVATION AND LIGHT DEVICE INCLUDING THEREOF

CROSS-REFERENCE TO RELATED APPLICATION AND PRIORITY

The present application is a non-provisional application which claims priority to and the benefit of U.S. Provisional Application No. 63/144,078 filed Feb. 1, 2021, the disclosure of which is incorporated by reference in its entirety.

BACKGROUND

Field

Embodiments of the present disclosure relate to a light module for plant cultivation and a lighting device including the same.

Related Art

Plants produce organic matter from carbon dioxide and water using light energy through photosynthesis. Plants use chemical energy of organic matter obtained through photosynthesis as nutrients for growth.

Plants contain phytochemicals that have beneficial effects on a subject in need thereof. Phytochemical levels of plants vary depending on growth environments. For example, plants produce antioxidants to protect themselves against damage from stress.

In recent years, a cultivation method of applying stress to plants through UV treatment is used to increase one or more content of phytochemicals in the plants.

When a target plant is irradiated with high energy of ultraviolet light, the target plant may die or suffer appearance damage, such as dryness and browning of leaves, at a level that makes it difficult to take or extract phytochemicals from the target plant.

The above information disclosed in the Background section is only for understanding of the background of the inventive concepts and, therefore, it may contain information that does not constitute prior art.

SUMMARY

Embodiments of the present disclosure provide a light module for plant cultivation, which can increase the content of phytochemicals of plants while minimizing damage to appearance of the plants upon UV treatment, and a lighting device including the same.

In accordance with one embodiment of the present disclosure, there is provided a light module including a substrate, at least one first light source, at least one second light source, and at least one third light source. The first light source is disposed on the substrate and emits a first type of light towards a plant. The second light source is disposed on the substrate and emits a second type of light towards the plant. In addition, the third light source is disposed on the substrate and emits a third type of light towards the plant. The first to third types of light have peak wavelengths in different wavelength bands. The first type of light is UV light or blue light in a short wavelength band, the second type of light is UV light, and the third type of light is visible light.

In accordance with another embodiment of the present disclosure, there is provided a lighting device for plant cultivation including: a light module that includes a substrate and a light source unit. The light source unit includes at least one first light source, at least one second light source, and at least one third light source. The first light source, the second light source and the third light source are mounted on the substrate and emit light towards a plant. The first light source emits a first type of light that is UV light or blue light in a short wavelength band. The second light source emits a second type of light that is UV light having a peak wavelength in a shorter wavelength band than the first type of light. In addition, the third light source emits a third type of light that is visible light.

The light module for plant cultivation according to embodiments of the present disclosure and the lighting device including the same can increase the content of phytochemicals in plants while minimizing damage to appearance of the plants upon UV treatment.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a schematic view illustrating a UV treatment method.

DETAILED DESCRIPTION

Figure 1:
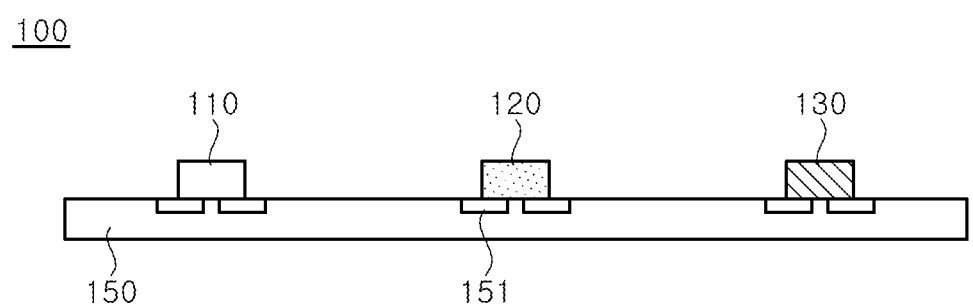
FIG. 1 is an exemplary view of a light module for plant cultivation according to one embodiment of the present disclosure.

Hereinafter, embodiments of the present disclosure will be described with reference to the accompanying drawings. It should be understood that the embodiments are provided for complete disclosure and thorough understanding of the present disclosure by those skilled in the art. Therefore, the present disclosure is not limited to the following embodiments and may be embodied in different ways. In addition, the drawings may be exaggerated in width, length, and thickness of components for descriptive convenience and clarity only. Like components will be denoted by like reference numerals throughout the specification.

In accordance with one embodiment of the present disclosure, a light module for plant cultivation includes a substrate, at least one first light source, at least one second light source, and at least one third light source. The first light source is disposed on the substrate and emits a first type of light towards a plant. The second light source is disposed on the substrate and emits a second type of light towards the plant. The third light source is disposed on the substrate and emits a third type of light towards the plant. The first to third types of light have peak wavelengths in different wavelength bands. The first type of light is UV light or blue light in a short wavelength band, the second type of light is UV light, and the third type of light is visible light.

The first type of light may be light in a longer wavelength band than the second type of light.

For example, the third type of light may be visible light corresponding to a mixture of red light, blue light and white light. Alternatively, the third type of light may be visible light having the same spectrum as sunlight.

According to the embodiment, in the light module, the second light source may emit the second type of light towards the plant after the first light source emits the first type of light towards the plant.

The first type of light emitted from the first light source may improve durability of the plant with respect to the second type of light.

In addition, the first type of light emitted from the first light source and the second type of light emitted from the second light source may increase the content of phytochemicals in the plant.

Further, the third type of light emitted from the third light source may be delivered to the plant to promote photosynthesis of the plant.

In accordance with another embodiment of the present disclosure, there is provided a lighting device for plant cultivation including a light module that includes a substrate and a light source unit. The light source unit includes at least one first light source, at least one second light source, and at least one third light source. The first light source, the second light source and the third light source are mounted on the substrate and emit light towards a plant. The first light source emits a first type of light corresponding to UV light or blue light in a short wavelength band. The second light source emits a second type of light corresponding to UV light having a peak wavelength in a shorter wavelength band than the first type of light. In addition, the third light source emits a third type of light corresponding to visible light.

For example, the third type of light may be visible light corresponding to a mixture of red light, blue light and white light. Alternatively, the third type of light may be visible light having the same spectrum as sunlight.

According to the embodiment, in the lighting device, the second light source may emit the second type of light towards the plant after the first light source emits the first type of light towards the plant.

The first type of light emitted from the first light source may improve durability of the plant with respect to the second type of light.

In addition, the first type of light emitted from the first light source and the second type of light emitted from the second light source may increase the content of phytochemicals in the plant.

Further, the third type of light emitted from the third light source may be delivered to the plant to promote photosynthesis of the plant.

The lighting device may further include an input unit through which a signal for controlling the light source unit is input, and a controller controlling operation of the light source unit in response to the signal input through the input unit.

The lighting device may further include a storage unit storing data with respect to operation of the light source unit in response to the signal input through the input unit. The controller may control operation of the light source unit by obtaining the data with respect to operation of the light source unit from the storage unit in response to the signal input through the input unit.

In another embodiment, the light source unit may include a first light source unit including multiple first light sources, a second light source unit including multiple second light sources, and a third light source unit including multiple third light sources.

The controller may control the intensity of light emitted from each of the first light source unit, the second light source unit and the third light source unit by controlling the number of first light sources, second light sources, and third light sources in operation.

In a further embodiment, the light source unit may include a first light source unit and a second light source unit. The first light source unit may include a first-1 light source emitting the first type of light, a second-1 light source emitting the second type of light, and a third-1 light source emitting the third type of light. In addition, the second light source unit may include a first-2 light source emitting the first type of light, a second-2 light source emitting the second type of light, and a third-2 light source emitting the third type of light. Here, the first-2 light source may emit a higher intensity of the first type of light than the first-1 light source. In addition, the second-2 light source may emit a higher intensity of the second type of light than the second-1 light source. Further, the third-2 light source may emit a higher intensity of the third type of light than the third-1 light source.

The controller may control operation of at least one light emitting unit selected from among the first light source unit and the second light source unit based on information on the intensity of light included in the data corresponding to the signal input through the input unit.

Next, embodiments of the present disclosure will be described with reference to the accompanying drawings.

FIG. 1 is an exemplary view of a light module for plant cultivation according to one embodiment of the present disclosure.

Referring to FIG. 1, a light module 100 may include a first light source 110, a second light source 120, a third light source 130, and a substrate 150.

The first to the third light sources 110, 120, 130 may emit light having peak wavelengths in different wavelength bands. In some forms, the first to the third light sources 110, 120, 130 emit light that may change different properties of a target plant.

According to one embodiment, at least one of the first light source 110 and the second light source 120 may emit UV light to increase one or more content of phytochemicals in a plant.

For example, the first light source 110 may emit a first type of light in the UVB wavelength band and the second light source 120 may emit a second type of light in the UVB wavelength band.

The first type of light may have a higher peak wavelength than the second type of light. That is, the first type of light may have a long wavelength and the second type of light may have a short wavelength.

The first type of light emitted from the first light source 110 may serve to improve durability of the plant with respect to the second type of light. In addition, the first type of light may increase the content of phytochemicals in the plant.

The second type of light emitted from the second light source 120 may increase the content of phytochemicals in the plant.

Further, at least one of the first light source 110 and the second light source 120 may emit light in a wavelength band capable of suppressing proliferation of infectious agents causing disease in plants or capable of sterilizing the infectious agents. At least one of the first light source 110 and the second light source 120 may emit light in the UVC wavelength band or blue light in a short wavelength band. Here, the blue light in the short wavelength band may have a wavelength in the range of about 400 nm to 420 nm.

For example, the first light source 110 may emit a first type of light in a wavelength band that suppresses proliferation of infectious agents. Further, the second light source 120 may emit a second type of light in a wavelength band that increases the content of phytochemicals in plants.

The first type of light may have a lower peak wavelength than the second type of light. For example, the first type of light may be light in the UVC wavelength band and the second type of light may be light in the UVB wavelength band.

Alternatively, the first type of light may have a higher peak wavelength than the second type of light. For example, the first type of light may be blue light in a short wavelength band and the second type of light may be light in the UVB wavelength band.

As such, in the light module 100 according to this embodiment, at least one of the first light source 110 and the second light source 120 may emit light capable of sterilizing infectious agents or suppressing proliferation of infectious agents, and the other light source may emit light capable of increasing the content of phytochemicals. Accordingly, the light module 100 according to this embodiment enables cultivation of plants having an increased content of phytochemicals while reducing a disease infection rate of the plants.

Further, the third light source 130 may emit a third type of light in the visible band to promote photosynthesis of the plants.

Figure 2:
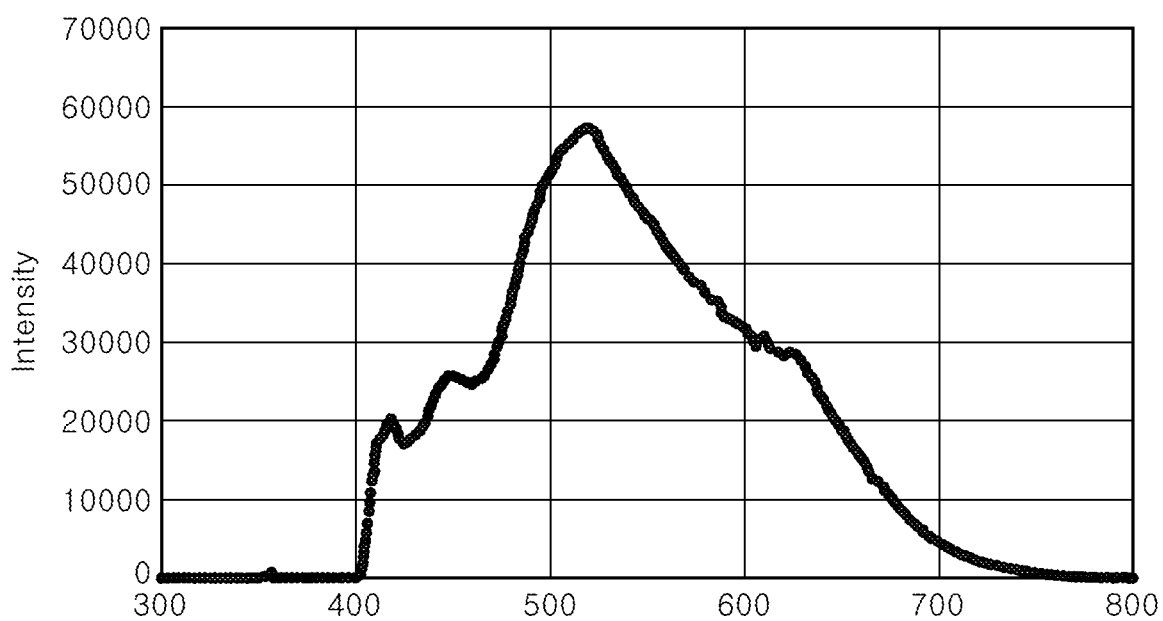
FIG. 2 is a graph depicting a spectrum of a third type of light corresponding to a mixture of red light, blue light and white light.

For example, the third type of light may be a mixture of red light, blue light and white light. FIG. 2 is a graph depicting a spectrum of the third type of light corresponding to the mixture of red light, blue light and white light.

Figure 3:
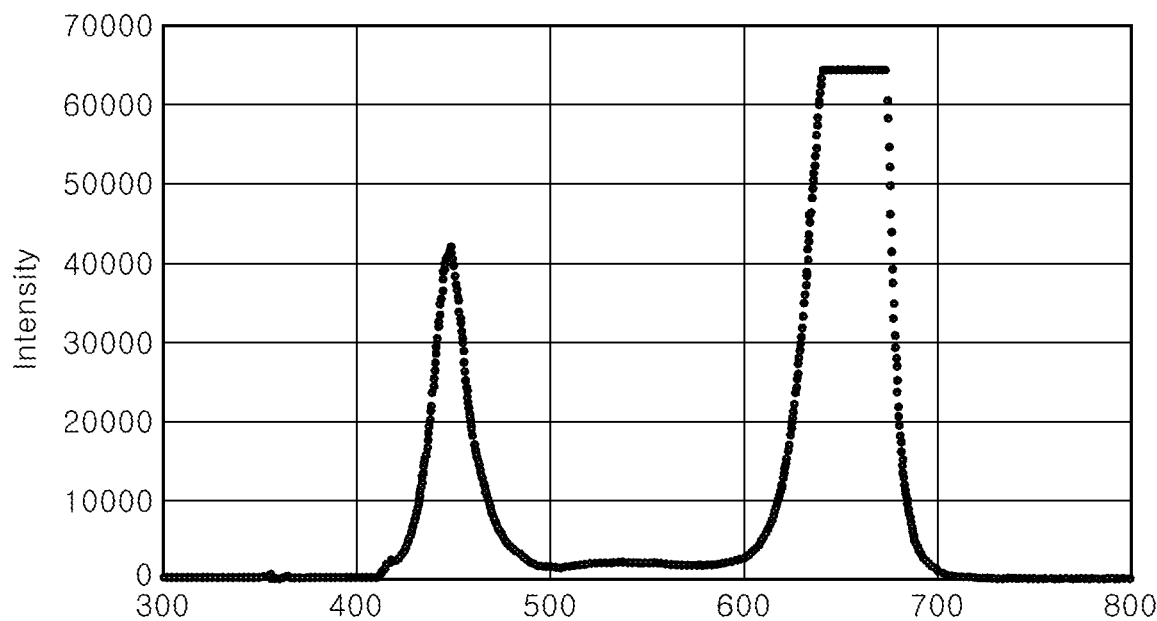
FIG. 3 is a graph depicting the spectrum of the third type of light similar to sunlight.

Alternatively, the third type of light may have a light spectrum similar to sunlight. FIG. 3 is a graph depicting the spectrum of the third type of light similar to sunlight. When the third type of light is light having a light spectrum similar to sunlight, it is possible to provide substantially the same optical environment as in cultivation of plants in an open field.

In FIG. 2 and FIG. 3, the x-axis represents the wavelength band of light and the y-axis represents relative intensity of light.

The first to the third light sources 110, 120, 130 are mounted on the substrate 150.

The substrate 150 may be a support substrate supporting the first to third light sources 110, 120, 130 such that the first to third types of light can be delivered to a plant. Alternatively, the substrate 150 may be a printed circuit board 150 that has interconnects electrically connected to the first to the third light sources 110, 120, 130 thereon.

Referring to FIG. 1, the first to third light sources 110, 120, 130 are mounted on an upper surface of the substrate 150. Further, the first to the third light sources 110, 120, 130 may be electrically connected to electrodes 151 formed on the upper surface of the substrate 150.

The light module 100 according to this embodiment may promote growth of the plant through photosynthesis with the third type of light of the third light source 130 and can increase the content of phytochemicals in the plant with the first type of light and the second type of light. Further, the light module 100 may use the first type of light corresponding to long-wavelength UVB light to minimize damage to the plant due to the second type of light by improving durability of the plant with respect to the second type of light corresponding to short-wavelength UVB light.

Figure 4:
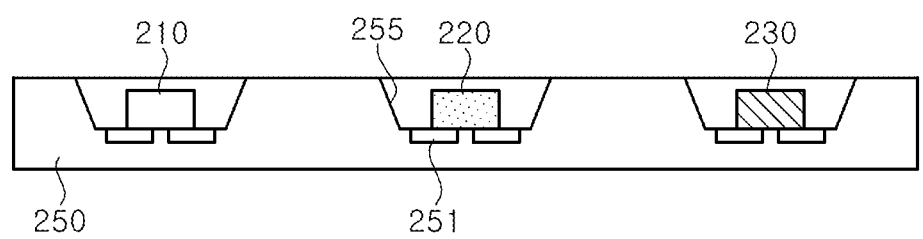
FIG. 4 is an exemplary view of a light module for plant cultivation according to another embodiment of the present disclosure.

FIG. 4 is an exemplary view of a light module for plant cultivation according to another embodiment of the present disclosure.

A light module 200 shown in FIG. 4 has the same structure as the light module 100 shown in FIG. 1 excluding a substrate 250.

Referring to FIG. 4, the substrate 250 includes a plurality of cavities 255. The cavities 255 may be formed on an upper surface of the substrate 250. Each of the cavities 255 may be formed with electrodes 251 acting as interconnects on a bottom surface thereof.

Further, the first to third light sources 210, 220, 230 may be disposed on the cavities 255 on the substrate 250 to be electrically connected to the electrodes 251 on the bottom surface of the cavities 255.

Each of the light modules 100, 200 according to the embodiments may be directly used as a plant cultivation device. Alternatively, the light modules 100, 200 according to the embodiments may be applied to a lighting device for plant cultivation.

A lighting device for plant cultivation described below includes the light modules shown in FIG. 1 and FIG. 4. That is, the first to the third light sources in the lighting device include substantially the same or similar characteristics as those of the first to the third light sources described with reference to FIG. 1 and FIG. 4. Accordingly, repeated description of the first to the third light sources will be omitted in the following description of the lighting device.

Figure 5:
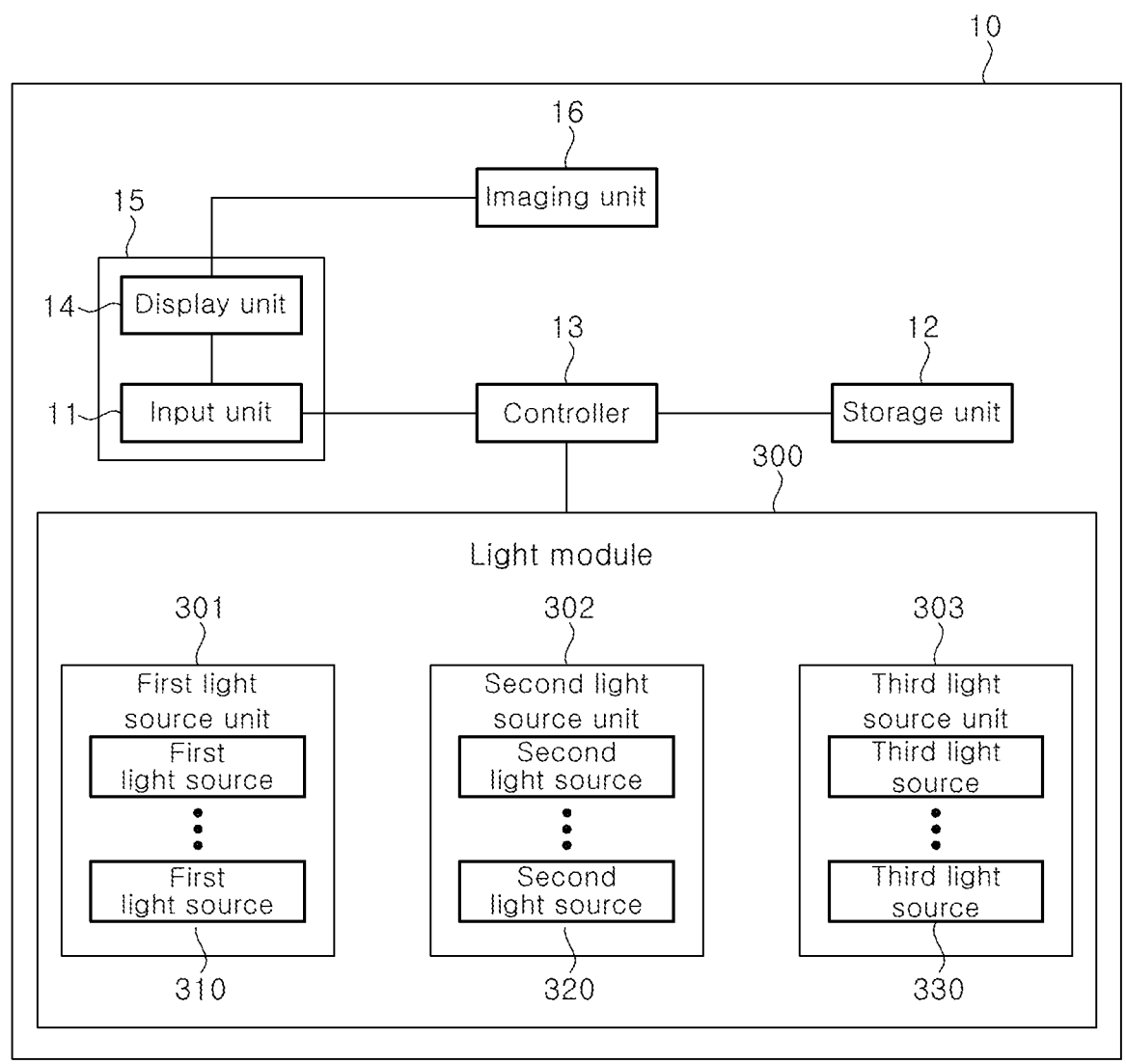
FIG. 5 is a block diagram of a lighting device for plant cultivation according to one embodiment of the present disclosure.

FIG. 5 is a block diagram of a lighting device for plant cultivation according to one embodiment of the present disclosure.

Referring to FIG. 5, a lighting device 10 for plant cultivation according to one embodiment includes an input unit 11, a storage unit 12, a controller 13, and a light module 300.

The input unit 11 allows a user to input a signal for operation of the lighting device 10 therethrough. That is, a user inputs commands for controlling the lighting device 10 through the input unit 11. The input unit 11 may send the input signal to the controller 13.

The storage unit 12 stores certain data. Here, the data may include light data for cultivation of plants corresponding to the input signal. For example, the light data may include a intensity of light corresponding to the input signal, a specific or different kind of light, a light irradiation time, and the like.

In response to the input signal, the controller 13 may select the light data corresponding to the input signal from the storage unit 12. Further, the controller 13 may control the light module 300 based on the selected light data.

According to this embodiment, the light module 300 may include first to third light source units 301, 302, 303.

The first light source unit 301 may include multiple first light sources 310, the second light source unit 302 may include multiple second light sources 320, and the third light source unit 303 may include multiple third light sources 330.

For description of the first to third light source units 301, 302, 303, descriptions of the first to third light sources 110, 120, 130 of the light module 300, described in connection with FIG. 1, can be referred to here.

In the light module 300 according to this embodiment, two or more of first to third light sources 310, 320, 330 may be mounted on the same substrate as shown in FIG. 5. In other words, the first light source unit 301 includes two or more of the first light sources 310, the second light source unit 320 includes two or more of the second light sources 320, and the third light source unit 330 includes two or more of the third light sources 330. In some forms, the first light source unit 301, the second light source unit 320, and the third light source unit 330 include two or more of the same light source units, respectively. In other forms, different types of light source units can be included in the first light source unit 301 includes two or more of the first light sources 310, the second light source unit 320, as will be described below in connection with FIG. 6.

Alternatively, the light module 300 may include substrates for the light source units such that each of the substrates may be provided with the light sources of a corresponding light source unit.

A method of mounting the light sources on the substrate may be modified in various ways. In response to the input signal, the controller 13 may control operation and a light irradiation time of the first to the third light source units 301, 302, 303 based on the light data corresponding to the input signal. Further, the controller 13 may control operation and a light irradiation time of each of the light sources in the first to the third light source units 301, 302, 303.

For example, the controller 13 may select at least one light source unit emitting light to be delivered to the plant from among the first to third light source units 301, 302, 303 based on the light data corresponding to the input signal. In addition, the controller 13 may control the intensity of light to be emitted from each of the light source units by selecting the light sources or the number of light sources, which will operate to emit light, among the light sources in the selected light source unit.

Further, the controller 13 may control operation of the light sources according to light emission start timing and light emission stop timing of each of the light source units based on the light data corresponding to the input signal.

As such, the lighting device 10 according to this embodiment may adjust the intensity of light to be delivered to the plant by controlling the number of light sources.

The lighting device 10 may further include features for confirmation of a plant cultivation process. For example, the lighting device 10 may further include an imaging unit 16 and a display unit 14.

The imaging unit 16 may photograph a space in which a plant is cultivated. That is, the imaging unit 16 may obtain a picture or an image of the plant under cultivation and may convert the picture or the image into an electrical signal. The imaging unit 16 may be selected from any devices capable of photographing a plant to confirm conditions of the plant. For example, the imaging unit 16 may be a camera. In addition, the imaging unit 16 may send the converted electrical signal to the display unit 14.

The display unit 14 may receive the electrical signal from the imaging unit 16. In addition, the display unit 14 may convert the electrical signal into a picture or an image and may output the picture or the image converted from the electrical signal. For example, the display unit 14 may be selected from any devices including a screen capable of visibly displaying the picture or the image.

Accordingly, the lighting device 10 allows a user to observe the plant cultivation process in real time through the imaging unit 16 and the display unit 14. In addition, the user can change the light data according to the plant conditions through the input unit 11. That is, the lighting device 10 allows a plant cultivation condition to be changed according to the plant conditions such that the plant can be grown in a suitable cultivation environment.

Further, the lighting device 10 may store the plant cultivation process and the plant cultivation condition in the storage unit 12.

Further, in the lighting device 10, each of the components may send and receive signals through wired or wireless communication. For example, the display unit 14 and the input unit 11 may be disposed in a single terminal 15. The single terminal 15 may perform wired or wireless communication with other components of the lighting device 10.

Figure 6:
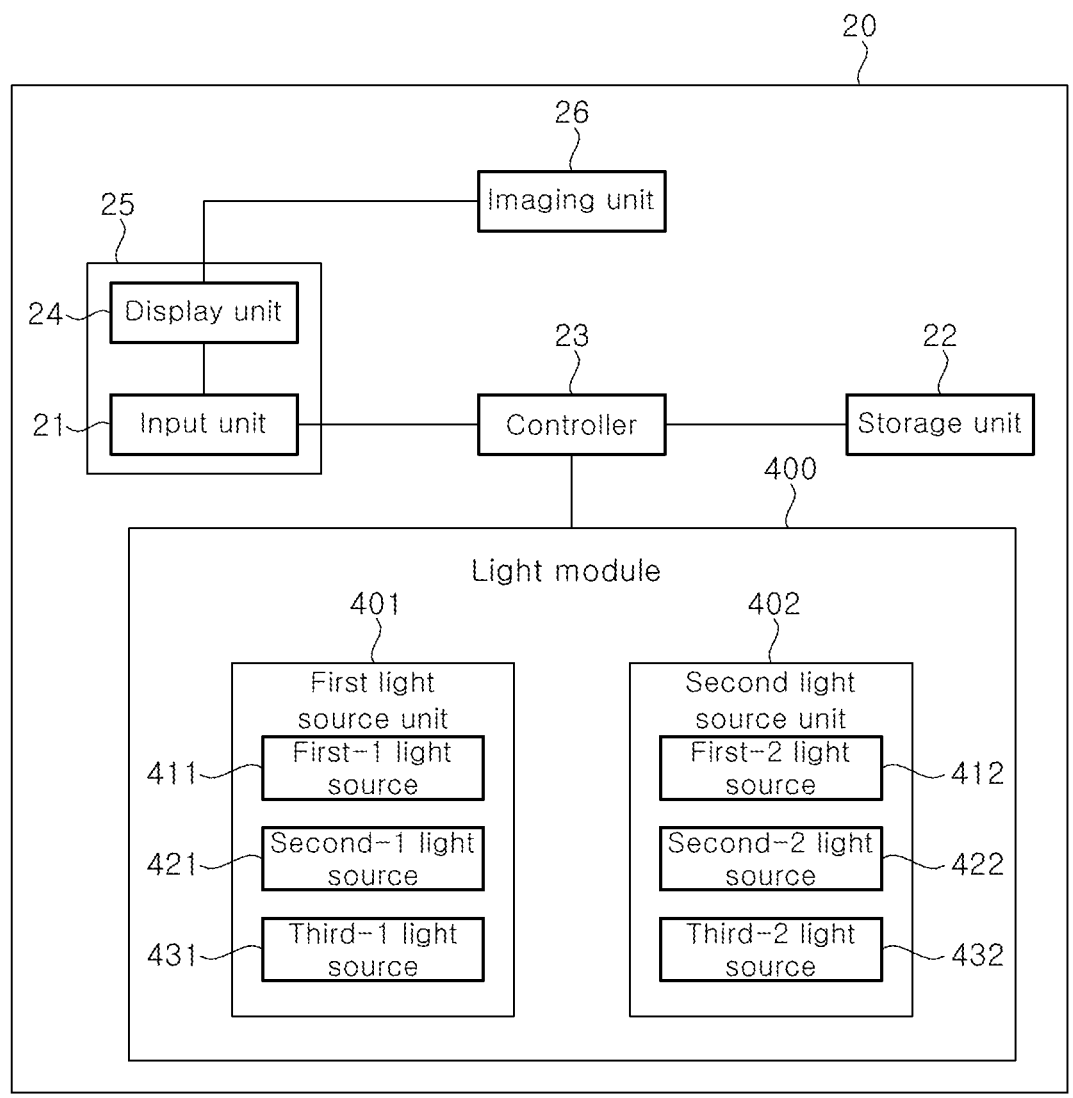
FIG. 6 is a block diagram of a lighting device for plant cultivation according to another embodiment of the present disclosure.

FIG. 6 is a block diagram of a lighting device for plant cultivation according to another embodiment of the present disclosure.

Referring to FIG. 6, a lighting device 20 according to this embodiment may include an input unit 21, a storage unit 22, a controller 23, and a light module 400.

The input unit 21, the storage unit 22 and the controller 23 of the lighting device according to this embodiment are the same as the input unit 11, the storage unit 12 and the controller 13 of the lighting device 10 shown in FIG. 5, respectively. That is, for description of the input unit 21, the storage unit 22 and the controller 23 of the lighting device according to this embodiment, description of the input unit 11, the storage unit 12 and the controller 13 of the lighting device 10 shown in FIG. 5 can be applied.

As described in the lighting device 10 shown in FIG. 5, the lighting device 20 according to this embodiment may further include a display unit 24 and an imaging unit 26, and may include a terminal 25 in which the input unit 21 and the display unit 24 are disposed.

According to this embodiment, the light module 400 may include a first light source unit 401 and a second light source unit 402.

The first light source unit 401 may include at least one first-1 light source 411, at least one second-1 light source 421, and at least one third-1 light source 431.

The second light source unit 402 may include at least one first-2 light source 412, at least one second-2 light source 422, and at least one third-2 light source 432.

Although the light source 411 and the first-2 light source 412 are the same type of light sources as the first light source 410 shown in FIG. 1, the first-1 light source 411 and the first-2 light source 412 may emit different quantities of light. Further, although the second-1 light source 421 and the second-2 light source 422 are of the same type of light source as the second light source 420 shown in FIG. 1, the second-1 light source 421 and the second-2 light source 422 may emit different quantities of light. Further, although the third-1 light source 431 and the third-2 light source 432 are of the same type of light source as the third light source 430 shown in FIG. 1, the third-1 light source 431 and the third-2 light source 432 may emit different quantities of light.

The light sources of the first light source unit 401 may emit a greater intensity of light than the light sources of the second light source unit 402. That is, the first light source unit 401 may include the light sources emitting a high intensity of light and the second light source unit 402 may include the light sources emitting a low intensity of light.

According to this embodiment, the controller 23 may select at least one of the first light source unit 401 and the second light source unit 402 according to the intensity of light in the light data corresponding to the input signal. In addition, the controller 23 may control operation of the light sources included in the selected light source unit according to the kind of light source included in the light data.

According to this embodiment, the light module 400 includes two kinds of light source units depending upon the intensity of light. However, the light module may further include light source units having various light intensity levels.

Although not shown in FIG. 1, FIG. 4, FIG. 5 and FIG. 6, the light module may further include a light source adapted to emit infrared light, as needed.

Experiments were performed with respect to the light module including the first to the third light sources according to the embodiments or the lighting device including the same. Hereinafter, the experiments and results thereof will be described. In the following description, the first type of light refers to long-wavelength UVB light emitted from the light module according to the embodiments and the first light source of the lighting device. In addition, the second type of light refers to short-wavelength UVB light emitted from the light module according to the embodiments and the second light source of the lighting device. In addition, visible light refers to visible light emitted from the light module according to the embodiments and the third light source of the lighting device. The first type of light may refer to UVC or blue light having a short wavelength, the second type of light may refer to UVB light, and the third type of light may refer to visible light.

For an experiment to confirm changes in plant growth and phytochemical content according to UV light, plant seeds were sown in a sowing sponge.

After sowing, the plant seeds were germinated using purified water under dark conditions for 3 to 5 days.

Seeds germinated 3 to 5 days after sowing and were cultivated in the sowing sponge using visible light until planting. During cultivation in the sowing sponge, a light period for which the germinated seeds were irradiated with visible light and a dark period for which irradiation with visible light was stopped were alternated. Here, the light period was set to 16 hours and the dark period was set to 8 hours. In addition, a light source used for the light period was a visible light LED (red light:blue light:white light=11:3:2) and the intensity of visible light intensity was 210 PPFD (Photosynthetic Photon Flux Density, $\mu mol/cm^2/s$).

Plants grown in the sowing sponge for 2 weeks were planted in a deep flow technique (DFT) system and then grown using a freshwater hydroponics method. The DFT system was set to cultivation conditions of a temperature of 22±2° C., a humidity of 70±10%, 16 hours of light period, and 8 hours of dark period. A light source used for the light period was a visible light LED (red light:blue light:white light=11:3:2) and the visible light intensity was 210 $\mu mol/cm^2/s$. Further, a nutrient solution used for cultivation was a Hoagland's nutrient solution having a PH of 6.5±0.1 and an EC of 1.2±0.01d·S/m.

Basil was grown for 3 weeks in the DFT system and red leaf lettuce was grown for 2 weeks in the DFT system. UV treatment may be performed in the light period. For example, as shown in FIG. 7, upon irradiation of the plants with the first type of light corresponding to long-wavelength UV light, the first type of light may be delivered to the plants throughout the light period. In addition, when the plants were continuously irradiated with the second type of light corresponding to short-wavelength UV light, the second type of light may be delivered to the plants for a predetermined period of time instead of delivery of the second type of light for the entire light period. This is because the plants can be damaged due to high intensity of the second type of light upon irradiation with the second type of light for the entire light period. In addition, for the light period, the third type of light may be continuously delivered to the plants for a preset light period.

After harvesting the plants, growth and phytochemicals of a control group of plants subjected to no UV treatment and experimental groups of plants subjected to UV treatment were analyzed.

Experimental group 1 refers to a group of plants subjected to UV treatment with the first type of light emitted from the first light source. Here, the first type of light was delivered in a total dose of 23.04 $kJ/m^2$ to Experimental group 1 for the entire cultivation period.

Experimental group 2 refers to a group of plants also subjected to UV treatment with the first type of light emitted from the first light source. Here, the first type of light was delivered in a total dose of 46.08 $kJ/m^2$ to Experimental group 2 for the entire cultivation period.

Each of Experimental group 3 and Experimental group 4 refers to a group of plants subjected to UV treatment using the first light source, followed by UV treatment using the second light source.

To Experimental group 3, the first type of light was delivered in a total dose of 23.04 $kJ/m^2$ and the second type of light was delivered in a total dose of 2.16 $kJ/m^2$.

To Experimental group 4, the first type of light was delivered in a total dose of 46.08 $kJ/m^2$ and the second type of light was delivered in a total dose of 2.16 $kJ/m^2$.

Experimental group 5 refers to a group of plants subjected to UV treatment with the second type of light emitted from the second light source. Here, the second type of light was delivered in a total dose of 2.16 $kJ/m^2$ to Experimental group 5 for the entire cultivation period.

Among phytochemicals, the contents of flavonol and anthocyanin were measured using a Dualex analyzer. An undestroyed sample (e.g., leaf) was placed on a photodetector of the Dualex analyzer and was irradiated with light. Then, the photodetector measured the intensity of light absorbed by the sample at the maximum absorption wavelength according to substances of the sample. For example, the maximum absorption wavelength of flavonol was set to about 300 nm and the maximum absorption wavelength of anthocyanin was set to about 500 nm. The Dualex analyzer displayed the amount of flavonol with numerals in the range of 0 to 3 and the amount of anthocyanin with numerals in the range of 0 to 15 depending on the intensity of light absorbed by the leaf.

Further, among the phytochemicals, chlorogenic acid, chicoric acid, and rosmarinic acid were extracted by pulverizing the plants after drying each of the plants and the extracts were analyzed using high pressure liquid chromatography (HPLC).

For these experiments, basil and red leaf lettuce were used as the plants.

Basil

For a period of time for which UV treatment was carried out, the first or the second type of light was continuously delivered to basil for a predetermined period of time every day.

Figure 8:
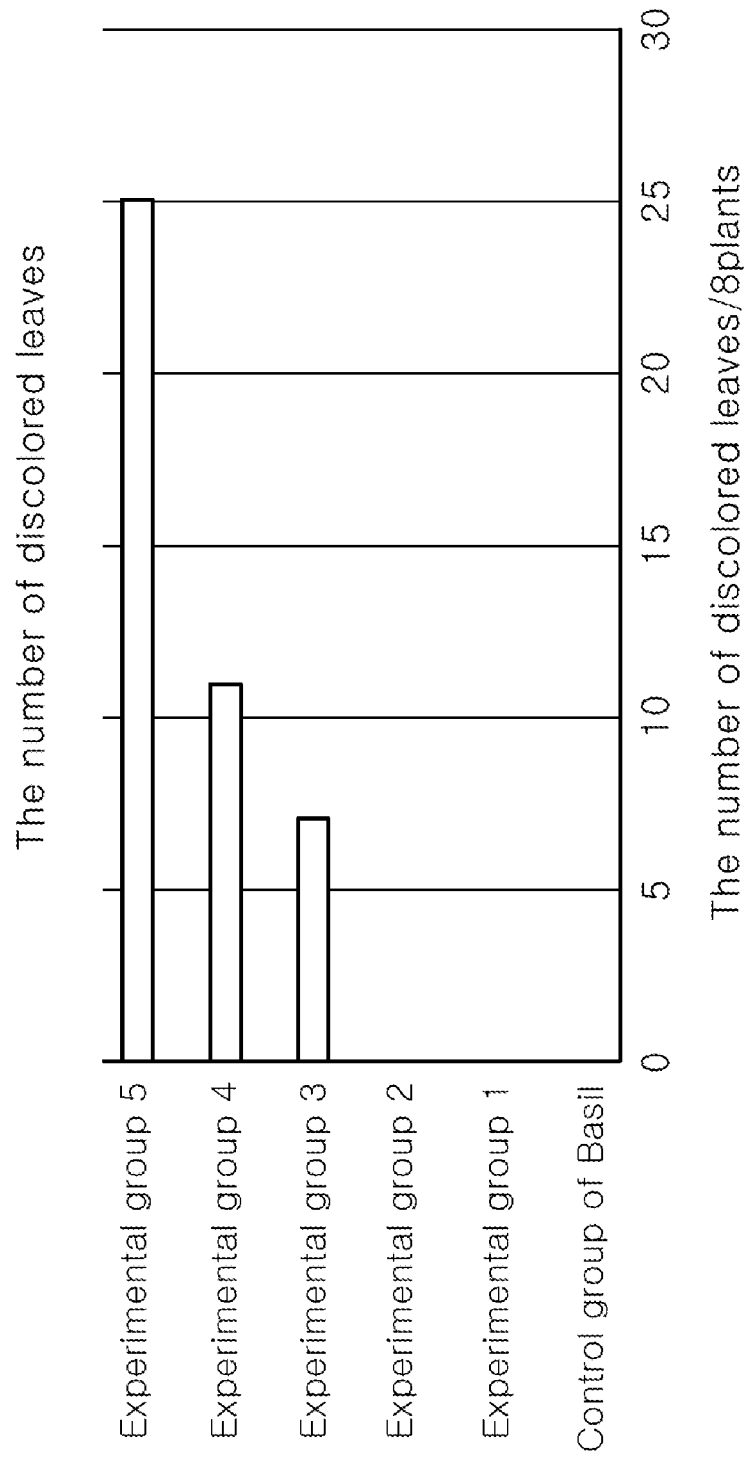
FIG. 8 is a graph depicting a damage level of appearance of basil upon UV treatment.

FIG. 8 is a graph depicting a damage level of appearance of basil upon UV treatment.

Referring to FIG. 8, the damage level of appearance of basil upon UV treatment could be checked based on a discolored degree of basil. In FIG. 8, the x-axis represents a count or number of discolored leaves based on 8 individual plants.

Experimental results showed that there was no discolored leaf in the control group, Experimental group 1, and Experimental group 2. However, there were discolored leaves in Experimental groups 3, 4 and 5, which were subjected to UV treatment with the second type of light having a short wavelength. In particular, Experimental group 5 subjected to UV treatment with the second type of light alone had the greatest number of discolored leaves. That is, Experimental group 5 suffered from the largest damage due to UV treatment using the second type of light alone.

Figure 9:
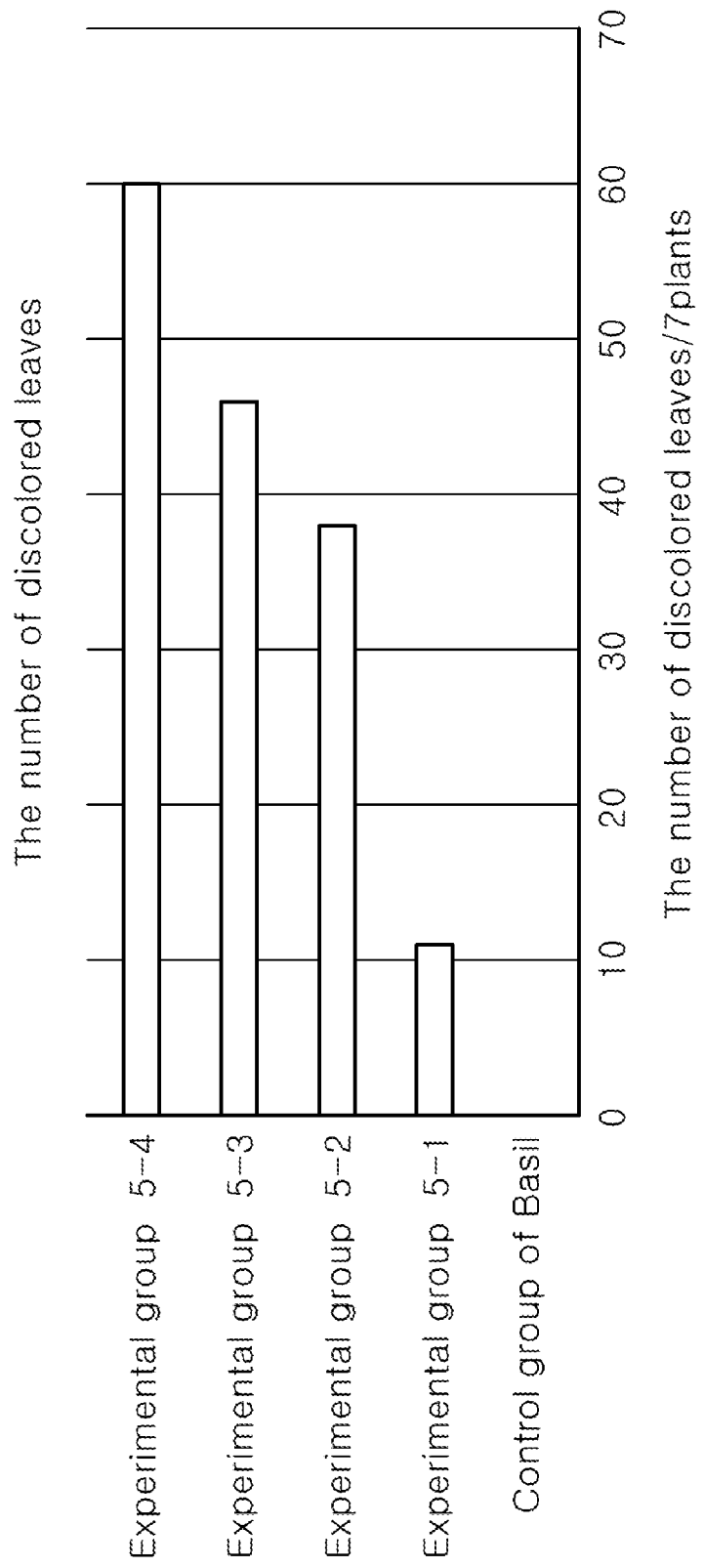
FIG. 9 is a graph depicting changes in damage level of appearance of basil depending upon irradiance of a second type of light having a short wavelength.

FIG. 9 is a graph depicting changes in damage level of appearance of basil depending upon irradiance of a second type of light having a short wavelength.

Experimental group 5-1 refers to a group of basil subjected to UV treatment under the same conditions as Experimental group 5. That is, the second type of light was delivered in a total dose of 2.16 kJ/m$^2$ to Experimental group 5-1.

The second type of light was delivered in a total dose of 4.32 kJ/m$^2$ to Experimental group 5-2, in a total dose of 8.64 kJ/m$^2$ to Experimental group 5-3, and in a total dose of 17.28 kJ/m$^2$ to Experimental group 5-4.

In FIG. 9, the x-axis represents the number of discolored leaves based on 7 individual plants.

Referring to FIG. 9, it could be seen that the damage level of appearance of basil increased in the order of the control group, Experimental group 5-1, Experimental group 5-2, Experimental group 5-3, and Experimental group 5-4. In addition, it could be seen that the damage level of appearance of basil rapidly increased in Experimental group 5-1, Experimental groups 5-2, 5-3 and 5-4 with reference to the control group.

That is, it could be seen that the damage level of appearance of basil increased with increasing energy of the second type of light.

Referring again to FIG. 8, Experimental groups 3 to 5 refer to groups of basil subjected to UV treatment using the second type of light having a short wavelength. In Experimental groups 3 to 5, UV treatment of basil was performed using the same total energy of the second type of light.

Experimental group 5 subjected to UV treatment using the second type of light having a short wavelength alone suffered more significant damage than Experimental groups 3 and 4. That is, UV treatment of basil irradiated with the first type of light and then with the second type of light provided less damage to the appearance of basil than UV treatment of basil irradiated with the second type of light alone. That is, it can be seen that damage to the appearance of basil can be reduced when UV treatment is performed using the first type of light before UV treatment using the second type of light.

As such, the plants may be irradiated with the first type of light corresponding to long-wavelength UV light to improve durability with respect to the second type of light corresponding to short-wavelength UV light. Accordingly, the plants may be subjected to UV treatment with long-wavelength light before UV treatment with short-wavelength light for increasing the content of phytochemicals, thereby minimizing damage due to short-wavelength UV light.

Figure 10:
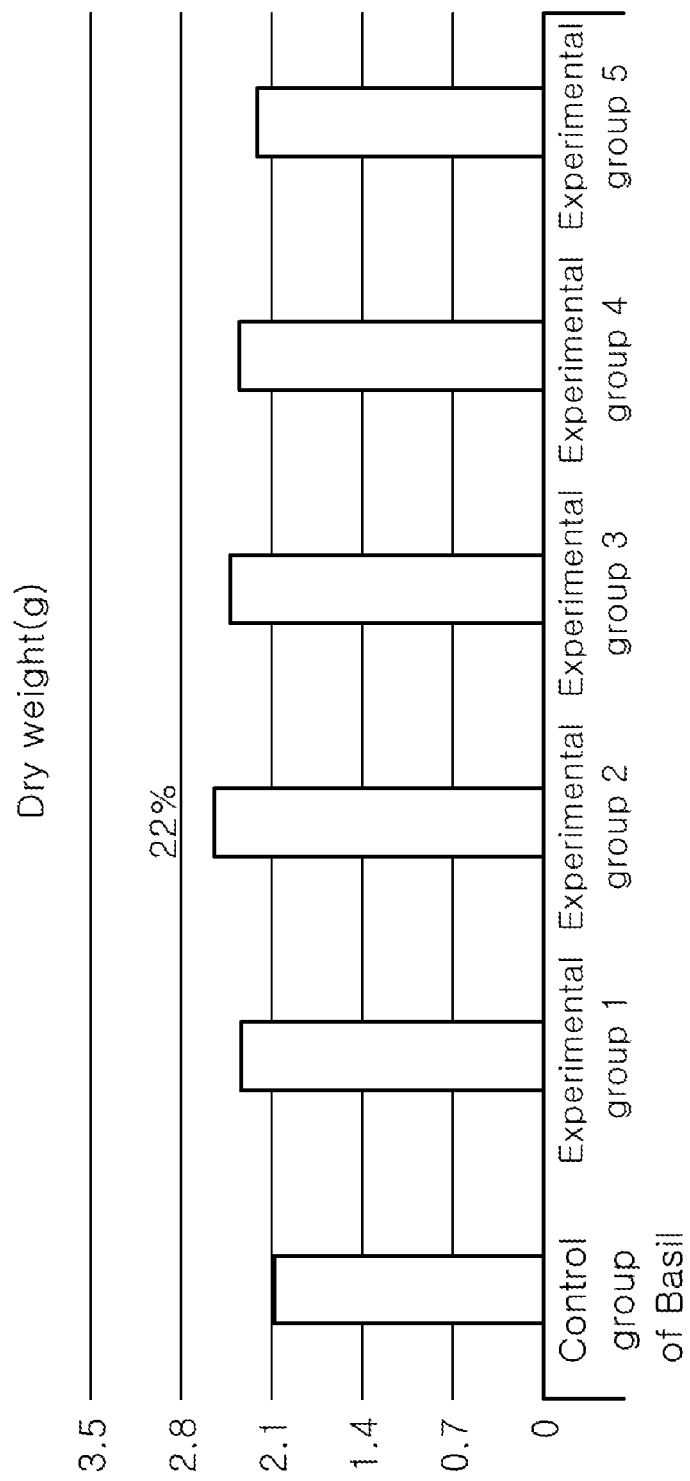
FIG. 10 is a graph depicting changes in dry weight of an aerial part of basil upon UV treatment.

FIG. 10 is a graph depicting changes in dry weight of an aerial part of basil upon UV treatment.

Referring to FIG. 10, there was no significant difference in dry weight between all of Experimental groups 1, 3, 4 and 5 and the control group. In Experimental group 2, the dry weight of the plants increased about 22%, as compared to the plants in the control group.

Accordingly, it could be understood that UV treatment performed with respect to Experimental groups 1 to 5 did not obstruct growth of basil.

Figure 11:
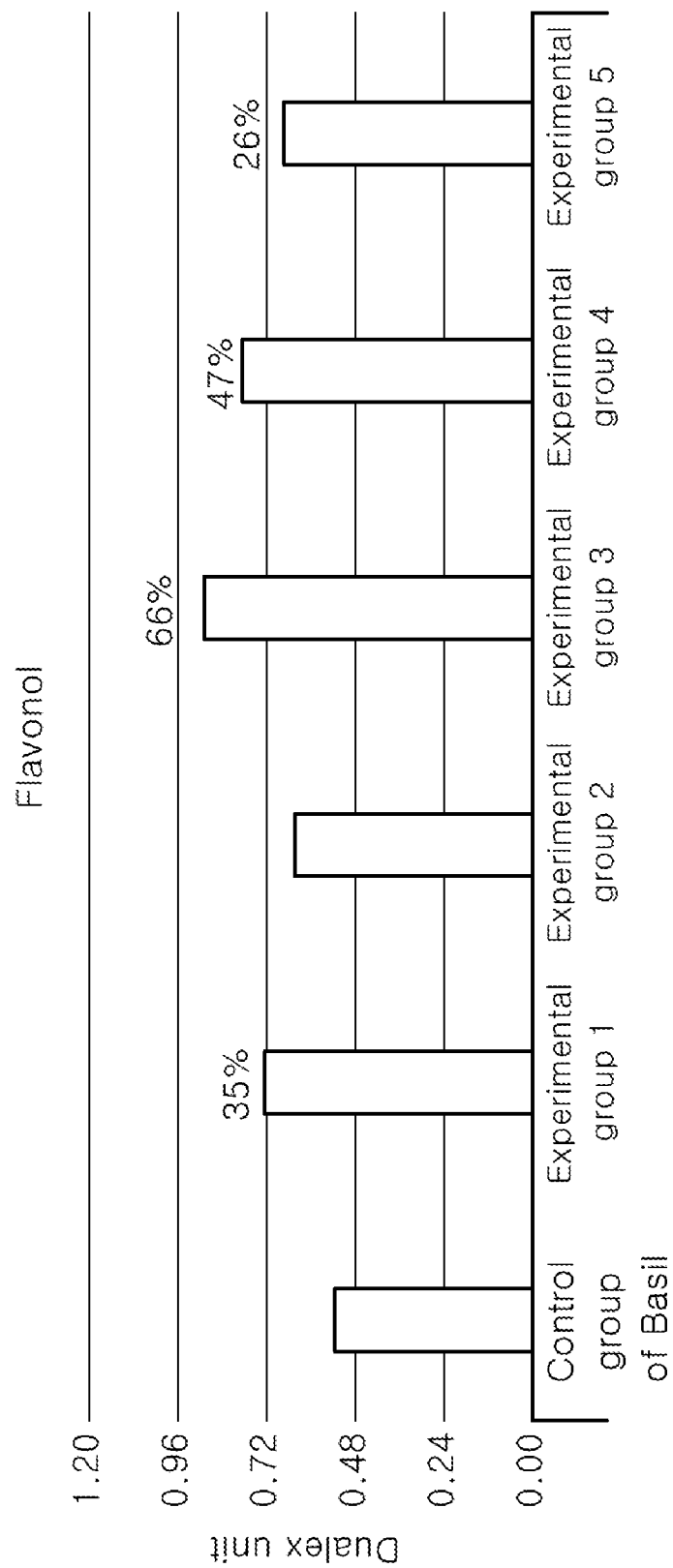
FIG. 11 is a graph depicting changes in flavonol content of basil upon UV treatment.

FIG. 11 is a graph depicting changes in flavonol content of basil upon UV treatment.

Referring to FIG. 11, as compared to the control group, the content of flavonol increased about 35% in Experimental group 1, about 66% in Experimental group 3, about 47% in Experimental group 4, and about 26% in Experimental group 5. There was no significant difference in flavonol content between Experimental group 2 and the control group.

As such, it could be seen that the content of flavonol in basil was further increased upon UV treatment with both the first type of light and the second type of light than UV treatment with the first type of light having a long wavelength alone or the second type of light having a short wavelength alone.

Figure 12:
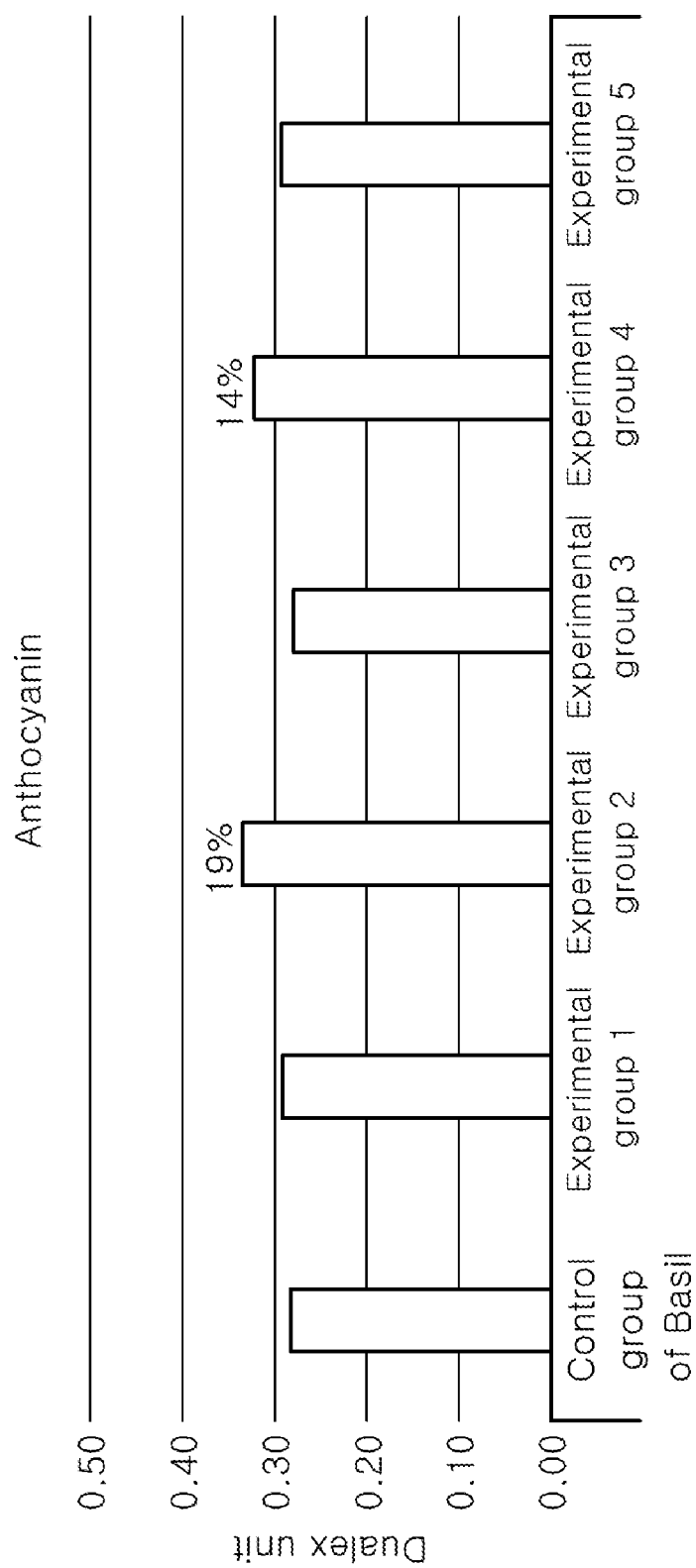
FIG. 12 is a graph depicting changes in anthocyanin content of basil upon UV treatment.

FIG. 12 is a graph depicting changes in anthocyanin content of basil upon UV treatment.

Referring to FIG. 12, as compared to the control group, the content of anthocyanin increased about 19% in Experimental group 2 and about 14% in Experimental group 4. There was no significant difference in anthocyanin content between all of Experimental groups 1, 3 and 5 and the control group.

As such, it could be seen that there was a significant increase in anthocyanin content when the total energy of the first type of light was high upon UV treatment of basil.

Figure 13:
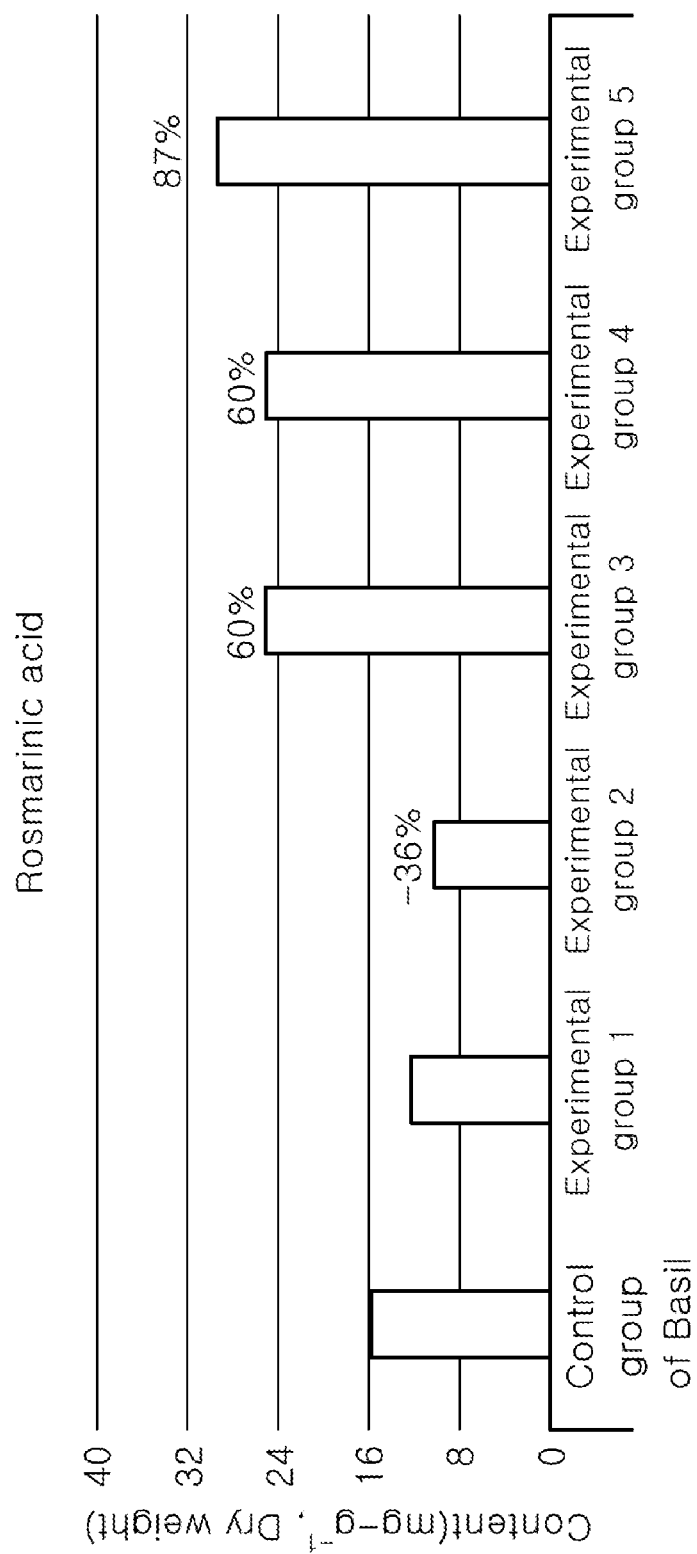
FIG. 13 is a graph depicting changes in rosmarinic acid content of basil upon UV treatment.

FIG. 13 is a graph depicting changes in rosmarinic acid content of basil upon UV treatment.

Referring to FIG. 13, as compared to the control group, the content of rosmarinic acid increased about 60% in both Experimental group 3 and Experimental group 4, and about 87% in Experimental group 5. In addition, in Experimental groups 1 and 2, the content of rosmarinic acid was decreased, as compared to the control group. That is, it could be seen that the content of rosmarinic acid in basil was increased upon UV treatment with the second type of light having a short wavelength.

From the results shown in FIG. 8 to FIG. 13, it could be seen that UV treatment of basil with the second type of light having a short wavelength alone caused damage to the appearance of basil and UV treatment of basil with the first type of light having a long wavelength alone caused decrease in content of rosmarinic acid in basil. However, UV treatment of basil with both the first type of light having a long wavelength and the second type of light having a short wavelength can increase the contents of flavonol and rosmarinic acid while minimizing damage to the appearance of basil. Here, it could be seen that, upon UV treatment of basil with both the first type of light and the second type of light, a high total energy of the first type of light increased the contents of all of flavonol, anthocyanin and rosmarinic acid than no UV treatment of basil.

Red Leaf Lettuce

For a period of time for which UV treatment was carried out, the first type of light was continuously delivered to red leaf lettuce for a predetermined period of time every day. In addition, the second type of light was delivered in a pulse pattern to red leaf lettuce for a predetermined period of time. Here, the pulse pattern refers to an alternate operation of the second light source emitting light and stopping light emission.

Figure 14:
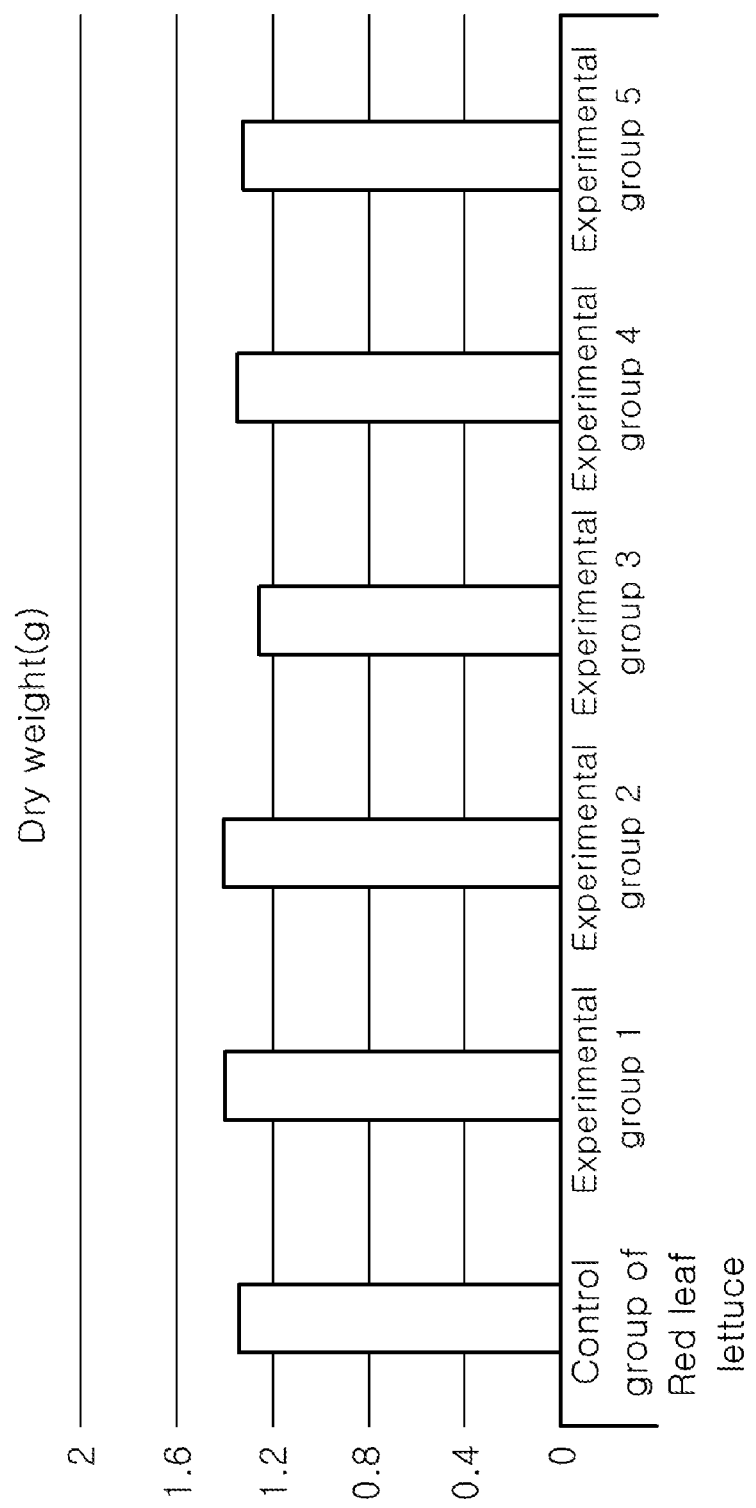
FIG. 14 is a graph depicting changes in dry weight of an aerial part of red leaf lettuce upon UV treatment.

FIG. 14 is a graph depicting changes in dry weight of an aerial part of red leaf lettuce upon UV treatment.

Referring to FIG. 14, there was no significant difference in dry weight between all of Experimental groups and the control group.

That is, it could be seen that growth of red leaf lettuce was not significantly affected by UV treatment using at least one of the first type of light and the second type of light.

Figure 15:
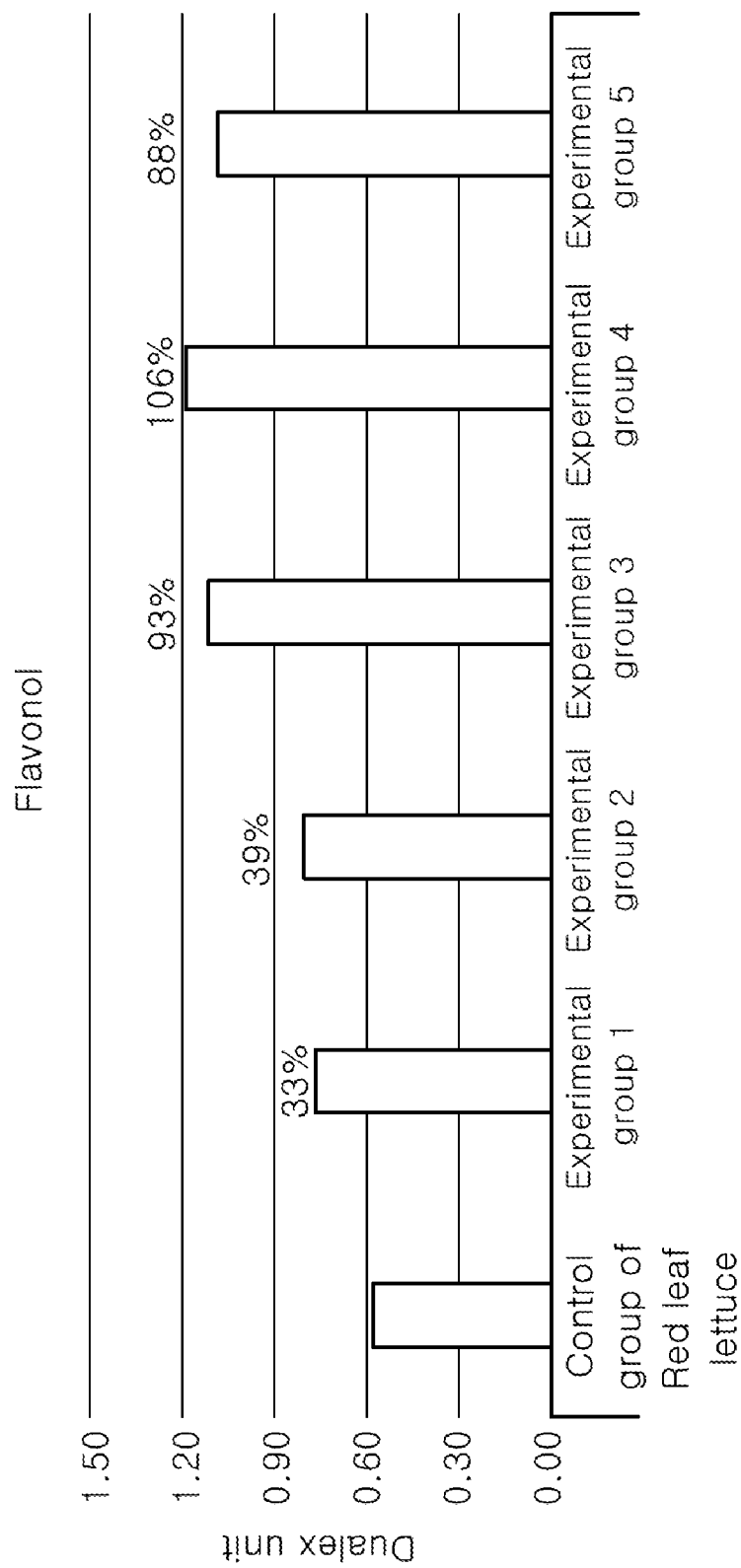
FIG. 15 is a graph depicting changes in flavonol content of red leaf lettuce upon UV treatment.

FIG. 15 is a graph depicting changes in flavonol content of red leaf lettuce upon UV treatment.

Referring to FIG. 15, as compared to the control group, the content of flavonol increased about 33% in Experimental group 1, about 39% in Experimental group 2, about 93% in Experimental group 3, about 104% in Experimental group 4, and about 88% in Experimental group 5.

It could be seen that UV treatment of red leaf lettuce using at least one of the first type of light and the second type of light increased the content of flavonol.

In addition, it could be seen that the content of flavonol in red leaf lettuce was more significantly increased upon UV treatment with the second type of light having a short wavelength than upon UV treatment with the first type of light having a long wavelength alone.

In particular, it could be seen that the content of flavonol in red leaf lettuce was further increased upon UV treatment with both the first type of light and the second type of light than upon UV treatment with the first type of light or the second type of light alone.

Figure 16:
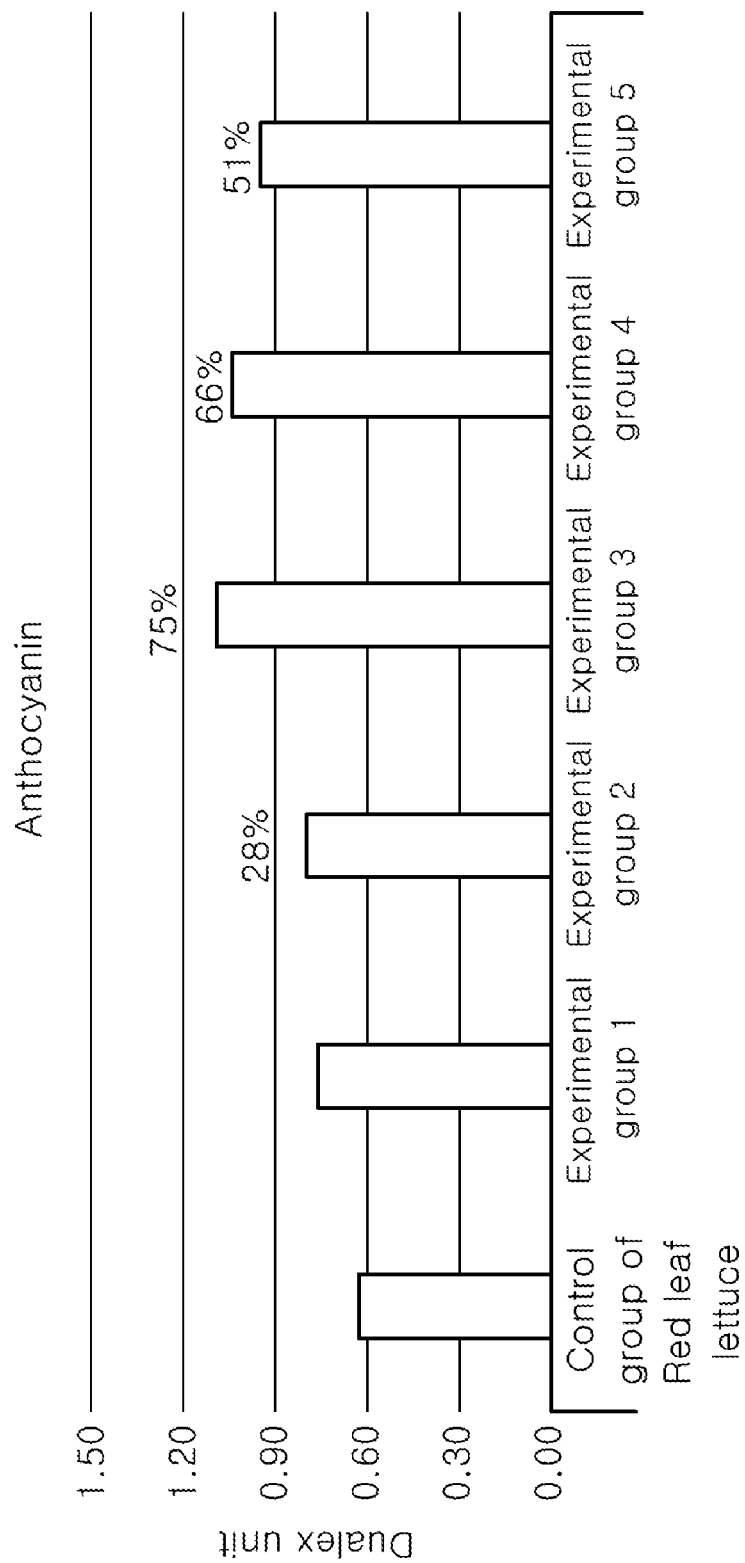
FIG. 16 is a graph depicting changes in anthocyanin content of red leaf lettuce upon UV treatment.

FIG. 16 is a graph depicting changes in anthocyanin content of red leaf lettuce upon UV treatment.

Referring to FIG. 16, as compared to the control group, the content of anthocyanin increased about 28% in Experimental group 2, about 75% in Experimental group 3, about 14% in Experimental group 4, and about 51% in Experimental group 5. There was no significant difference in content of anthocyanin between Experimental group 1 and the control group.

As such, it could be seen that, upon UV treatment of red leaf lettuce with both the first type of light and the second type of light, the content of anthocyanin was further increased than upon UV treatment with the first type of light or the second type of light alone.

Figure 17:
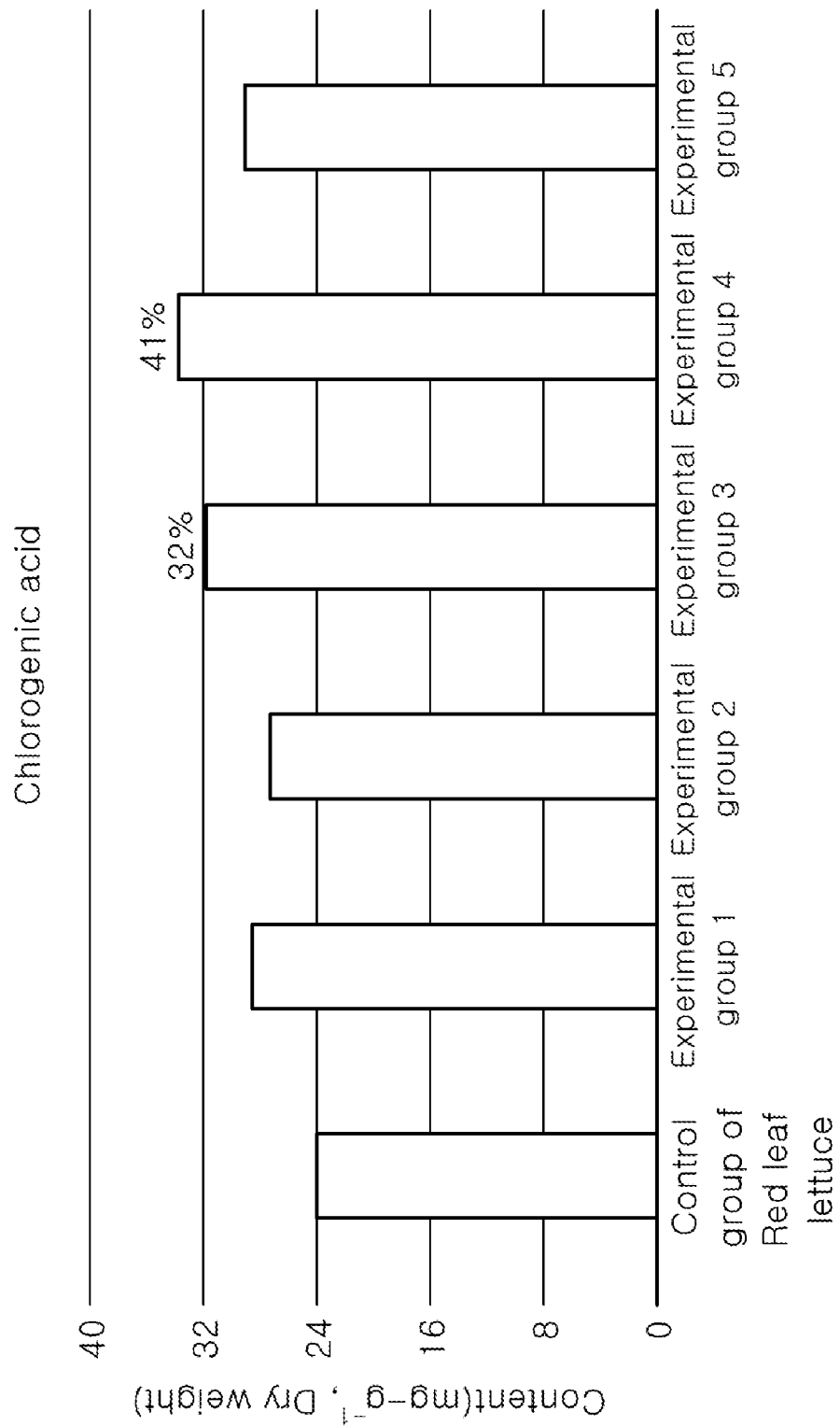
FIG. 17 is a graph depicting changes in chlorogenic acid content of red leaf lettuce upon UV treatment.

FIG. 17 is a graph depicting changes in chlorogenic acid content of red leaf lettuce upon UV treatment.

Referring to FIG. 17, as compared to the control group, the content of chlorogenic acid increased about 32% in Experimental group 3 and about 41% in Experimental group 4. There was no significant difference in content of chlorogenic acid between all of Experimental groups 1, 2 and 5 and the control group.

As such, it could be seen that, upon UV treatment of red leaf lettuce with both the first type of light and the second type of light, the content of chlorogenic acid was further increased than upon UV treatment with the first type of light or the second type of light alone.

Figure 18:
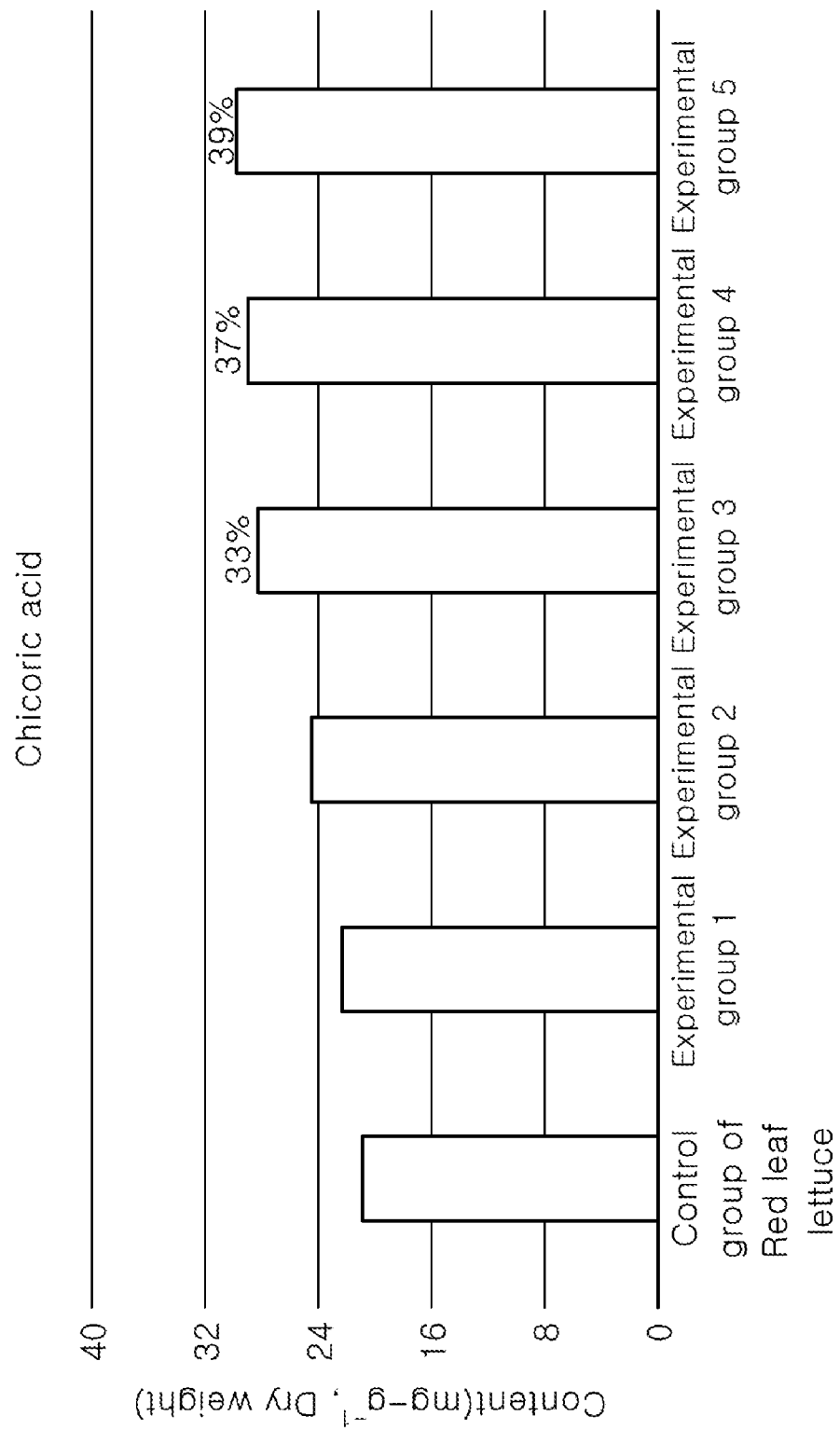
FIG. 18 is a graph depicting changes in chicoric acid content of red leaf lettuce upon UV treatment.

FIG. 18 is a graph depicting changes in chicoric acid content of red leaf lettuce upon UV treatment.

Referring to FIG. 18, as compared to the control group, the content of chicoric acid increased about 21% in Experimental group 2, about 33% in Experimental group 3, about 37% in Experimental group 4, and about 39% in Experimental group 5. There was no significant difference in content of chicoric acid between Experimental group 1 and the control group.

As such, it could be seen that the content of chicoric acid in red leaf lettuce was significantly increased upon UV treatment with light including the second type of light corresponding to short-wavelength UV light.

In addition, it could be seen that there was no significant difference in increase rate of the content of chicoric acid in red leaf lettuce between UV treatment with the second type of light alone and UV treatment with both the first type of light and the second type of light.

As such, it can be seen through the experiments with respect to basil and red leaf lettuce that the content of phytochemicals in plants can be increased without damage to appearance and growth of the plants upon UV treatment using both the first type of light corresponding to long-wavelength UV light and the second type of light corresponding to short-wavelength UV light.

The light module and the lighting device according to the embodiments of the present disclosure include both the first light source emitting long-wavelength UV light and the second light source emitting short-wavelength UV light. That is, the light module and the lighting device according to the embodiments may perform UV treatment of plants using both long-wavelength UV light and short-wavelength UV light. Accordingly, the light module and the lighting device according to the embodiments can cultivate plants having a higher content of phytochemicals without damage to appearance and growth of the plants.

Although some embodiments have been described herein, it should be understood that these embodiments are provided for illustration only and are not to be construed in any way as limiting the present disclosure. The scope of the present disclosure should be defined by the appended claims and equivalents thereto.

The invention claimed is:

1. A light module for plant cultivation, comprising:
a substrate;
at least one first light source disposed on the substrate and emitting a first type of light towards a target plant;
at least one second light source disposed on the substrate and emitting a second type of light towards the target plant; and
at least one third light source disposed on the substrate and emitting a third type of light towards the target plant,
wherein the first type of light, the second type of light and the third type of light have peak wavelengths in different wavelength bands,
the first type of light corresponds to UV light or blue light in a short wavelength band;

the second type of light corresponds to UV light or blue light in the short wavelength band, and the third type of light corresponds to visible light, and wherein irradiation of the target plant with the first type of light reduces damage in the target plant due to irradiation with the second type of light.

2. The light module for plant cultivation according to claim 1, wherein the first type of light has a longer wavelength band than a wavelength band of the second type of light.

3. The light module for plant cultivation according to claim 1, wherein the third type of light is visible light corresponding to a mixture of red light, blue light and white light.

4. The light module for plant cultivation according to claim 1, wherein the third type of light is visible light having a spectrum corresponding to a spectrum of sunlight.

5. The light module for plant cultivation according to claim 1, wherein the at least one second light source emits the second type of light towards the target plant after the at least one first light source emits the first type of light towards the target plant.

6. The light module for plant cultivation according to claim 5, wherein the at least one first light source and the at least one second light source emit both the first type of light and the second type of light that change a second property of the target plant, the second property including one or more content of phytochemicals in the target plant.

7. The light module for plant cultivation according to claim 1, wherein the third type of light emitted from the at least one third light source is delivered to the target plant such that a third property of the target plant is changed, the third property relating to photosynthesis of the target plant.

8. A lighting device for plant cultivation, comprising:
a light module comprising a substrate and a light source unit, the light source unit comprising at least one first light source, at least one second light source, and at least one third light source mounted on the substrate and emitting light towards a target plant,
wherein the at least one first light source emits a first type of light corresponding to UV light or blue light in a short wavelength band,
the at least one second light source emits a second type of light corresponding to UV light having a peak wavelength in a shorter wavelength band than the first type of light, and
the at least one third light source emits a third type of light corresponding to visible light; and
a controller controlling operation of the light source unit, wherein the controller operates the light source unit to irradiate the target plant with the first type of light to reduce damage in the target plant due to irradiation with the second type of light.

9. The lighting device for plant cultivation according to claim 8, wherein the third type of light is visible light corresponding to a mixture of red light, blue light and white light.

10. The lighting device for plant cultivation according to claim 8, wherein the third type of light is visible light having a spectrum corresponding to a spectrum of sunlight.

11. The lighting device for plant cultivation according to claim 8, wherein the controller is further operable to control:
the at least one second light source to emit the second type of light towards the target plant after the at least one first light source emits the first type of light towards the target plant.

12. The lighting device for plant cultivation according to claim 11, wherein the controller is further operable to control the at least one first light source and the at least one second light source such that the at least one first light source and the second type of light emitted from the at least one second light source change a second property of the target plant including one or more content of phytochemicals in the target plant.

13. The lighting device for plant cultivation according to claim 8, wherein the controller is further operable to control the at least one third light source such that the third type of light emitted from the at least one third light source changes a third property of the target plant relating to photosynthesis of the target plant.

14. The lighting device for plant cultivation according to claim 8, further comprising:
an input unit through which a signal for controlling the light source unit is input; and
wherein the controller further controls operation of the light source unit in response to the signal input through the input unit.

15. The lighting device for plant cultivation according to claim 14, further comprising:
a storage unit storing data with respect to operation of the light source unit in response to the signal input through the input unit,
wherein the controller controls operation of the light source unit by obtaining the data with respect to operation of the light source unit from the storage unit in response to the signal input through the input unit.

16. A lighting device for plant cultivation, comprising:
a light module comprising a substrate and a light source unit, the light source unit comprising:
a first light source unit comprising two or more first light sources;
a second light source unit comprising two or more second light sources; and
a third light source unit comprising two or more third light sources; and
wherein the light sources of each light source unit include at least one light source that emits a first type of light and at least one light source that emits a second type of light, the first and second types of light having peak wavelengths in different wavelength bands;
a controller controlling operation of the first light source unit, the second light source unit, the third light source unit, individually or in combination;
an input unit through which a signal for controlling the light source unit is input;
a storage unit storing data with respect to operation of the light source unit in response to the signal input through the input unit; and
wherein the controller controls operation of the light source unit by obtaining the data with respect to operation of the light source unit from the storage unit in response to the signal input through the input unit, wherein the data with respect to operation of the light source unit for at least one signal causes the controller to operate the light source unit to irradiate the target plant with the first type of light to reduce damage in the target plant due to irradiation with the second type of light.

17. The lighting device for plant cultivation according to claim 16, wherein the controller controls an intensity of light emitted from each of the first light source unit, the second light source unit and the third light source unit by controlling a count of first light sources, a count of second light sources, and a count of third light sources in operation.

18. The lighting device for plant cultivation according to claim 16, wherein:
the first light source unit further comprises a first-1 light source emitting the first type of light, a second-1 light source emitting the second type of light, and a third-1 light source emitting a third type of light, and
the second light source unit further comprises a first-2 light source emitting the first type of light, a second-2 light source emitting the second type of light, and a third-2 light source emitting the third type of light,
wherein the first-2 light source emits a higher intensity of the first type of light than the first-1 light source,
the second-2 light source emits a higher intensity of the second type of light than the second-1 light source, and
the third-2 light source emits a higher intensity of the third type of light than the third-1 light source.

19. The lighting device for plant cultivation according to claim 18, wherein:
the controller controls operation of at least one light source selected from among the first light source unit and the second light source unit based on information on an intensity of light included in the data corresponding to the signal input through the input unit.

* * * * *